United States Patent [19]

Waldrop et al.

[11] Patent Number: 5,852,091
[45] Date of Patent: *Dec. 22, 1998

[54] SOLID ALCOHOL-FILLED PVC PIPE CEMENT

[75] Inventors: Mark W. Waldrop, Royal Oak, Mich.; William C. Walsh, Archbold, Ohio

[73] Assignee: BASF Corporation, Mt. Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 726,888

[22] Filed: Oct. 4, 1996

[51] Int. Cl.$^6$ ............................... C08K 5/05; C08L 27/06
[52] U.S. Cl. ................... 524/388; 524/386; 524/356; 524/359; 524/360; 524/527; 524/465; 524/468; 428/518; 156/309.6; 156/333
[58] Field of Search ..................... 524/388, 386, 524/356, 359, 360, 527, 465, 468

[56] References Cited

U.S. PATENT DOCUMENTS

| | | | |
|---|---|---|---|
| 3,817,900 | 6/1974 | Higuch et al. | 524/388 |
| 3,953,358 | 4/1976 | Sjogreen | 524/388 |
| 4,672,084 | 6/1987 | Dierdorf et al. | 524/113 |
| 4,687,798 | 8/1987 | King, Sr. | 524/100 |
| 4,788,002 | 11/1988 | King, Sr. | 252/364 |
| 5,252,634 | 10/1993 | Patel et al. | 523/218 |
| 5,252,651 | 10/1993 | Criquilion | 524/388 |
| 5,384,345 | 1/1995 | Naton | 523/218 |
| 5,407,983 | 4/1995 | Naton | 524/113 |
| 5,416,142 | 5/1995 | Bush et al. | 524/113 |

FOREIGN PATENT DOCUMENTS 0 489 485 A1   6/1992   European Pat. Off. .

OTHER PUBLICATIONS

ASTM Standard D 2564–88, "Standard Specification for Solvent Cements for Poly(Vinyl Chloride) (PVC) Plastic Pipe and Fittings".
ASTM Standard D 2855–90, "Standard Practice for Making Solvent–Cemented Joints with Poly(Vinyl Chloride) (PVC) Pipe and Fittings".

*Primary Examiner*—James J. Seidleck
*Assistant Examiner*—Olga Asinovsky
*Attorney, Agent, or Firm*—James J. Drake

[57] ABSTRACT

Disclosed is a solvent-based cement for bonding joints of polyvinyl chloride pipe and fittings. The cement of the composition contains at least about 10% by weight of a polyvinyl chloride resin, at least about 2% by weight of a solid alcohol having a melting point above at least about 20° C., and at least about 10% by weight of a solvent or a mixture of solvents. There is also provided a method of joining two pieces of thermoplastic material, such a poly (vinyl chloride) piping and fittings, and the product piece having one or more joints formed thereby.

19 Claims, No Drawings

5,852,091

SOLID ALCOHOL-FILLED PVC PIPE CEMENT

FIELD OF THE INVENTION

The present invention relates to solvent-based cements for bonding joints of polyvinyl chloride (PVC) pipe and fittings. This invention also relates to adhesives or sealants useful for bonding or welding two polymeric surfaces, at least one of which is PVC.

BACKGROUND AND SUMMARY OF THE INVENTION

Nearly half of the PVC manufactured today is used to form pipes, conduits, and fittings. PVC pipes and fittings are used extensively in the construction industry for both homes and businesses. For example, PVC pipes are used to transport potable water and water for household uses; for drain, waste, and vent (DWV) piping; for outdoor plumbing such as for irrigation and sprinkler systems; for Jacuzzis, spas, and tubs; and for electrical conduits.

Cements, or adhesives, used to form PVC pipe joints must meet both a lap shear bond strength standard and a hydrostatic burst strength standard, both set forth in ASTM D 2564-88, incorporated herein by reference. A strong bond between two pieces, at least one of which is thermoplastic PVC, is obtained by softening the PVC with the solvent in the cement so that the thermoplastic resin at the interface of the pieces to be joined flow together to bond the pieces when they are pressed together. The PVC resin in the cement serves to fill any voids between the pieces, thereby strengthening the bond.

In recent years, strict environmental regulations have prompted efforts aimed toward reducing the volatile organic compounds (VOC) in industrial materials, including plastic pipe cements. Initial efforts involved increasing the resin content of the cement. It was discovered, however, that when the amount of PVC was increased from 10 wt. % up to more than about 14 wt. %, the cement had the consistency of a gel and was difficult to handle. Further, in order to comply with ASTM D 2564-88 specifications, the cement must be capable of dissolving an additional 3 wt. % of PVC resin without gelation. At amounts greater than about 14 wt. % PVC, the typical cement formulations show signs of gelation.

Other inventors looked to inclusion of inert fillers, for example the hollow ceramic spheres and thixotropic agents such as fumed silica and bentonite clay disclosed by Patel et al., U.S. Pat. No. 5,252,634 and by Bush et al., U.S. Pat. No. 5,416,142, both patents being incorporated herein by reference. The cements produced according to these patents are relatively expensive because of the cost of the hollow ceramic spheres.

King, Sr. discloses in U.S. Pat. No. 4,788,002 compositions comprising 5- or 6-member lactam rings with a cosolvent selected from mono-alcohols having up to four carbon atoms; lower alkyl esters (up to 4 carbon atoms) of lower alkanoic acids (also up to four carbon atoms); and PVC or ABS polymer. The cosolvents disclosed by King, Sr. are volatile organic compounds that contribute to the VOC content of the cement.

Thus, there remains a need for an inexpensive cement with lower VOC content.

We have now discovered that the VOC content of a cement composition can be reduced by using as a filler certain solid alcohol compounds. Thus, according to the present invention, there is provided a cement composition comprising at least about 10% by weight of a polyvinyl chloride resin, preferably having an average particle size less than about 100 microns; at least about 2% by weight of a solid alcohol having a melting point above at least about 20° C.; and at least about 10% by weight of a solvent or a mixture of solvents. There is also provided a method of joining two pieces of thermoplastic material, such as poly (vinyl chloride) piping and fittings, and the product piece having one or more joints formed thereby.

DETAILED DESCRIPTION

The cements or adhesives of the invention comprise a solid alcohol, a thermoplastic resin, and one or more solvents. The thermoplastic resin is preferably a PVC resin. The solvent is preferably N-methyl pyrrolidone or a mixture of solvents that includes N-methyl pyrrolidone.

The solid alcohol that is preferably used in the compositions of the invention must be a compound that is solid at 20° C. and at ambient pressures. Thus, by "solid" we mean that the solid alcohols of the invention are compounds preferably having a well-defined melting point above at least about 20° C. In one preferred embodiment, the solid alcohol is a branched alcohol. The solid alcohols useful as fillers in the compositions of the present invention have up to about 20 carbon atoms, preferably from 3 to 12 carbon atoms, more preferably from 5 to 10 carbon atoms, and still more preferably from 5 to 8 carbon atoms. Examples of suitable alcohols include, without limitation, neopentyl glycol, 1,2-hexanediol, 1,5-hexanediol, 1,6-hexanediol, 2,5-hexanediol, neopentyl alcohol, trimethylolpropane, trimethylolethane, 2,2,4-trimethyl-1-pentanol, 2,2,4-trimethyl-1,3-pentanediol and mixtures thereof. Neopentyl glycol is especially preferred. Unlike solid fillers previously added to cement compositions, the solid alcohols of the present invention may behave as cosolvents or plasticizers when mixed with the solvent or solvent mixture of the cement.

The compositions of the invention contain from about 2 wt. % to about 50 wt. %, preferably from about 3 wt. % to about 30 wt. %, and particularly preferably from about 5 wt. % to about 15 wt. % of the solid alcohol. In one preferred embodiment, from about 7 wt. % to about 12 wt. % neopentyl glycol is used in making a cement.

The mixture of solvent or solvents and the solid alcohol must be capable of solvating or dispersing the PVC resin. Desirably, the solvent/solid alcohol mixture also participates in the bonding process by softening the plastic pieces to be joined. Because solid alcohol remains in the joint, the type and level of solid alcohol must be chosen so that the properties of the finished joint are good. In particular, ratios of solvent, solid alcohol, and PVC are preferably chosen so that the cement compositions will meet or exceed the standards for bond strength set out in ASTM D 2564-88, "Standard Specification for Solvent Cements for Poly(Vinyl Chloride) (PVC) Plastic Pipe and Fittings," incorporated herein by reference.

Many solvents may be useful in cements and adhesives. The solvent or solvent mixture chosen is preferably a volatile liquid capable of solvating or softening the thermoplastic materials to be joined. Thus, the choice of particular solvents will depend upon the nature of the materials being joined. Examples of useful preferred solvents include lower alcohols such as methanol, ethanol, and isopropanol; ketones such as acetone, methyl ethyl ketone, methyl propyl ketone, methyl isobutyl ketone, methyl isoamyl ketone, isophorone, and cyclohexanone; esters such as methyl acetate, ethyl acetate, ethyl formate, ethyl propionate, butyl acetate, propyl propionate, gammabutyrolactone, and epsilon-caprolactone; halogenated solvents such as dichloromethane, dichloroethane, carbon tetrachloride, chloroform, and trichloroethane; ethers such as propylene glycol monomethyl ether and dioxane; other liquids such as tetrahydrofuran and N-methyl pyrrolidone, and mixtures thereof.

When the materials to be joined will be in contact with potable water, it is preferred to employ solvents for which maximum allowable levels have been established by the National Sanitation Foundation (NSF) for use in potable water plumbing. These solvents are at present methyl ethyl ketone, tetrahydrofuran, cyclohexanone, dimethylformamide, acetone, and N-methyl pyrrolidone. It is especially advantageous to use up to 50 wt. % N-methyl pyrrolidone in the cement compositions. N-methyl pyrrolidone has a low vapor pressure, which results in good storage characteristics. The faster evaporating solvents such as methyl ethyl ketone, tetrahydrofuran, and acetone tend to evaporate from the cement over time, leading to increased viscosity. In addition, N-methyl pyrrolidone is an excellent solvent for PVC and has low toxicity.

The compositions of the invention contain from about 10 wt. % to about 88 wt. %, preferably from about 10 wt. % to about 70 wt. %, and particularly preferably from about 15 wt. % to about 50 wt. % solvent or a blend of solvents. In one preferred embodiment, from about 10 wt. % to about 50 wt. % N-methyl pyrrolidone is used in making a cement. It is also preferable to include at least as much N-methyl pyrrolidone by weight in the composition as the weight of solid alcohol filler employed. It is desirable not to use more than 50 wt. % N-methyl pyrrolidone because the slow evaporation of N-methyl pyrrolidone would mean that joints formed with compositions containing more than about 50% N-methyl pyrrolidone would take longer to develop ultimate properties such as lap shear strength. In order to develop lap shear strength and hydrostatic burst strength more quickly, the cement may include a fast-evaporating solvent, such as methyl ethyl ketone, that volatilizes quickly to allow the cement to cure (harden).

When other solvents are used instead of or in addition to N-methyl pyrrolidone, preferably the solvents are from about 35 wt. % to about 80 wt. % methyl ethyl ketone; from about 2 wt. % to about 40 wt. % tetrahydrofuran; from about 2 wt. % to about 10 wt. % cyclohexanone; from about 2 wt. % to about 10 wt. % dimethyl formamide; or from about 2 wt. % to about 40 wt. % acetone.

The compositions of the invention contain at least about 10 wt. % PVC resin, as is specified by ASTM D 2564-88. Preferably, the compositions contain up to 20 wt. % PVC resin. Compositions with 10–20 wt. % PVC resin, especially PVC resin having average particle size of from about 0.1 to about 20 microns, are particularly preferred.

It is especially desirable, in order to obtain the lowest VOC at the desired viscosity, to use in the cement a grade of PVC resin having an average particle size less than about 100 microns, preferably less than about fifty microns, and particularly preferably less than about twenty-five microns. One preferred embodiment uses a grade of PVC resin having average particle size from about 0.1 to about 20 microns. Preferably, the PVC resin is an emulsion grade PVC resin. Emulsion grade PVC resins are available commercially from The Geon Co., Cleveland, Ohio; Georgia Gulf Corp., PVC Div., Plaquemine, La.; Goodyear Tire & Rubber Co., Chemical Div., Akron, Ohio; Occidental Chemical Corp., Dallas, Tex.; Plastic Central-Materials, Kalamazoo, Mich.; among others.

Particle sizes may be determined according to known methods, such as sieving, laser diffraction techniques, Coulter counter, electron microscopy, and by sedimentation using a disk centrifuge.

While not wishing to be bound by theory, it is thought that the smaller particle sizes allow for more adsorption or interaction with the solid alcohol fillers in the cements. Suspension grade PVC resins, which usually have particle sizes above 100 microns, for example from 130 to 140 microns, can, however be useful in certain cement compositions, particularly when the solid alcohol used is 1,6-hexanediol. However, PVC resins with particle sizes above 100 microns are preferably ground to a particle size of less than 100 microns, preferably less than 50 microns, before being added to the cement of the invention. Suspension polymerization is carried out using known means, for example according to the methods described in 17 *Encyclopedia of Polymer Science* 298–329 (H. F. Mark et al. eds., 2d ed. 1989), the disclosure of which is incorporated herein by reference. Higher concentrations of protective colloids can be used to lower the particle size of suspension polymerized PVC.

Emulsion grade PVC can be synthesized according to methods well-known in the art, such as those described in 17 *Encyclopedia of Polymer Science* 329–376 (H. F. Mark et al. eds., 2d ed. 1989), the disclosure of which is incorporated herein by reference. Generally, the monomer is dispersed in water with surfactants or emulsifiers and agitation. A water-soluble initiator is used, and the polymerization takes place in the aqueous phase. Batch, semi-batch, and continuous polymerization techniques may be used. Typically, the resulting latex has a particle size of from about 0.1 to about 2 microns in diameter. Various particle sizes may be obtained by known means, including by using seeded emulsion or microsuspension processes. The prepared latex is spray-dried and milled to form a fine powder. The powder is incorporated in the cements of the invention.

The pipe cement, sealant, or adhesive may be prepared by any of a number of means. One method of preparation contemplated involves dissolving, emulsifying, or dispersing the solid alcohol filler in the solvent or solvent mixture, and then adding the PVC resin with sufficient shear to form the desired product. Another method of preparation contemplated involves dispersing the PVC resin in melted solid alcohol filler prior to addition of the solvent or solvent mixture. A third contemplated method involves preparation of the PVC resin in the presence of a water-insoluble solid alcohol filler. Other methods of preparation are contemplated and within the scope of the invention.

Pipe cements are usually formulated to have one of three standard viscosities that are used in the industry. According to ASTM D 2564-88 guidelines, a regular-bodied cement has a minimum viscosity of about 90 centipoise (cP); a medium-bodied cement has a minimum viscosity of about 500 cP; and a heavy-bodied cement has a minimum viscosity of about 1600 cP. All viscosities are measured at about 23° C. Usually the heavier-viscosity cement grades are used for pipes having larger diameters or for non-interference fits. For example, ASTM D 2564-88 specifies that the minimum viscosity that should be used on eight- to twelve-inch pipe is 1600 cP and the minimum viscosity that should be used on 2.5- to six-inch pipe is 500 cP for interference fits and 1600 cP for non-interference fits. The higher viscosity cements form thicker films and deposit more gap-filling PVC resin.

It will be appreciated that the cement, sealant, and adhesive compositions of the invention can contain optional ingredients, including those well-known in the art, such as other fillers, pigments, dyes, colorants, viscosity-modifying agents, stabilizers, and so forth. Such materials are readily available commercially, and the levels and methods of incorporation are well-known to the skilled artisan. Examples of useful additives include heat stabilizers such as organometallic compounds including alkyltin and dialkyltin compounds, plasticizers such as phthalate esters, pigments and other colorants, and fillers and viscosity-modifying agents such as colloidal silica, amorphous silica, silica flour, ground quartz, carbon black, titanium dioxide, barium sulfate, iron oxides, talc, barytes, fumed silica, treated bentonite clay, calcium carbonate, clays, magnesium silicate, magnesium oxide, micas, and hollow, silica-alumina alloy ceramic fillers such as Zeelan Z-Light spheres.

Pipe cements are usually applied by a process that includes application of a primer followed within about five minutes, preferably within about one minute, and particularly preferably in about thirty seconds to about one minute, by application of the cement. The primer is used to soften the one or both of the pieces to be joined.

Usually, the primer is a blend of the same solvents that are in the cement. The primer also usually includes one or more pigments or colorants. The pigments or colorants are included so that a building inspector can observe that primer was used in making the joint.

The cement is applied by brushing the cement onto one or, preferably, both of the surfaces to be joined and then bringing the two pieces to be joined together. The cement, like the primer, softens the contacting surfaces of the joined pieces. The cement may be applied in one or more coats. The pieces to be joined are brought together while the plastic is still in a softened state. Usually, the pieces are joined immediately after the final coat of cement is applied, or at least within about one minute, and preferably within about twenty seconds. Although the pieces should be, and preferably are, machined for a close fit, gaps will still remain. The purpose of the PVC resin in the cement is to fill the gaps in order to form a strong and durable bond between the joined pieces. Thus, sufficient cement must be applied to fill any gap between the joined pieces.

Preferably, when joints with PVC pipe and fittings are formed, the procedure followed is that of ASTM D 2855-90, "Standard Practice for Making Solvent-Cemented Joints with Poly(Vinyl Chloride) (PVC) Pipe and Fittings," which is incorporated herein by reference. The assembled joint is allowed to set for the time recommended by the ASTM method before installation. The assembled joint is allowed to fully cure (harden) before being put into use. During set and cure, the solvent evaporates and the thermoplastic materials harden. The times required for set and cure depend upon ambient conditions and are within the experience of the person of ordinary skill in the art. The setting or curing of the joint results from the solvents evaporating. The solvated resins of the surfaces and the PVC in the cement dry through the solvent evaporation and form a continuous, tight joint.

The invention is illustrated by the following examples. The examples are merely illustrative and do not in any way limit the scope of the invention as described and claimed. All parts are parts by weight unless otherwise noted.

EXAMPLES

Example 1

Cement Containing 10 wt. % Neopentyl Glycol

The cement was prepared by mixing together:

| | |
|---|---|
| methyl ethyl ketone | 56 wt. % |
| N-methyl pyrrolidone | 16 wt. % |
| tetrahydrofuran | 4 wt. % |
| cyclohexanone | 4 wt. % |
| neopentyl glycol | 10 wt. % |
| Geon PVC Resin 191 | 10 wt. % |

Geon PVC Resin 191 is a resin made by emulsion polymerization with particle size of about 1 micron.

The properties and performance of the Example 1 cement were tested according to the following tests and with the following results:

(1) Hydrostatic Burst Strength, ASTM D 2564-88 test method Minimum acceptable hydrostatic burst strength 400 psi at 2 hours cure time Hydrostatic burst strength of Example 1 1050 psi at 17 hours cure time (2) Lap Shear Strength, ASTM D 2564-88 test method Minimum acceptable lap shear strength 250 psi at 2 hours cure time, 500 psi at 16 hours cure time, 900 psi at 72 hours cure time Lap shear strength of Example 1, 380 psi at 48 hours cure time (3) VOC content according the South Coast Air Quality Management District (SCAQMD) Test No. 316A-92 Required as of Jan. 1, 1994: 450 g VOC/L Required as of Jan. 1, 1994: 250 g VOC/L VOC of Example 1: 438 g/L (4) Viscosity of Example 1: 1000 cP Example 2

Cement Containing 10 wt. % 1,6-Hexanediol

The cement was prepared by mixing together:

| | |
|---|---|
| methyl ethyl ketone | 56 wt. % |
| N-methyl pyrrolidone | 16 wt. % |
| tetrahydrofuran | 4 wt. % |
| cyclohexanone | 4 wt. % |
| 1,6-hexanediol | 10 wt. % |
| Geon PVC Resin 110X334 | 10 wt. % |

Geon PVC Resin 110X334 is a resin made by suspension polymerization with particle size of about 130–140 microns.

The properties and performance of the Example 2 cement were tested according to the tests used for Example 1 with the following results:

(1) Lap Shear Strength, ASTM D 2564-88 test method Minimum acceptable lap shear strength 250 psi at 2 hours cure time, 500 psi at 16 hours cure time, 900 psi at 72 hours cure time Lap shear strength of Example 1, 148 psi at 48 hours cure time (2) Viscosity of Example 2: 310 cP The invention has been described in detail with reference to preferred embodiments thereof. It should be understood, however, that variations and modifications can be made within the spirit and scope of the invention and of the following claims.

We claim:

1. A cement composition, consisting essentially of: (a) at least about 10% by weight of a poly(vinyl chloride) resin;

(b) at least about 2% by weight of a solid alcohol having up to 20 carbon atoms; (c) at least about 10% by weight of an organic solvent or a mixture of organic solvents; and (d) optionally, a member selected from the group consisting of fillers, pigments, dyes, colorants, viscosity-modifying agents, stabilizers, plasticizers, and mixtures thereof.

2. A cement composition according to claim 1, wherein the solid alcohol has from 3 to 8 carbon atoms.

3. A cement composition according to claim 1, wherein the solid alcohol is selected from the group consisting of neopentyl glycol, 1,2-hexanediol, 1,5-hexanediol, 1,6-hexanediol, 2,5-hexanediol, neopentyl alcohol, trimethylolpropane, trimethylolethane, 2,2,4-trimethyl-1-pentanol, 2,2,4-trimethyl-1,3-pentanediol and mixtures thereof.

4. A cement composition according to claim 1, wherein the PVC resin has an average particle size less than about 100 microns.

5. A cement composition according to claim 4, wherein the solid alcohol is neopentyl glycol.

6. A cement composition according to claim 1, comprising up to about 50% of the solid alcohol.

7. A cement composition according to claim 1, comprising from about 3 wt. % to about 30 wt. % of the solid alcohol.

8. A cement composition according to claim 4, comprising from about 7 wt. % to about 12 wt. % of neopentyl glycol.

9. A cement composition according to claim 1, comprising at least one solvent selected from the group consisting of methyl ethyl ketone, tetrahydrofuran, cyclohexanone, dimethylformamide, acetone, N-methyl pyrrolidone and mixtures thereof.

10. A cement composition according to claim 1, comprising N-methyl pyrrolidone.

11. A cement composition according to claim 10, wherein the N-methyl pyrrolidone is included at up to 50 wt. %.

12. A cement composition according to claim 10, wherein the weight ratio of N-methyl pyrrolidone to solid alcohol is about 1 to at least 1.

13. A cement composition according to claim 1, wherein the polyvinyl chloride resin has an average particle size of from about 0.1 to about 20 microns.

14. A cement composition according to claim 1, wherein the polyvinyl chloride resin is an emulsion grade polyvinyl chloride resin.

15. A cement composition according to claim 14, wherein the polyvinyl chloride resin is present in an amount of up to about 20 wt. %.

16. A cement composition according to claim 1, wherein the melting point of the solid alcohol is above at least about 20° C.

17. A method of joining two surfaces of thermoplastic material together in a bond or weld, comprising the steps of:
   (a) applying a cement composition according to claim 1 to at least one of the surfaces to be joined;
   (b) allowing the surface or surfaces to be softened by the cement;
   (c) joining the two surfaces together while the surface is still in a softened state; and
   (d) allowing the bond or weld to fully cure.

18. An article having at least one bond or weld formed according to the method of claim 17.

19. An article having at least one interface of two polymeric surfaces bonded or welded together with a mixture comprising a cement composition according to claim 1.

* * * * *